Patented Apr. 28, 1931

1,803,174

UNITED STATES PATENT OFFICE

EDWARD S. DAWSON, JR., OF SCHENECTADY, NEW YORK, ASSIGNOR TO GENERAL ELECTRIC COMPANY, A CORPORATION OF NEW YORK

RESINOUS CONDENSATION PRODUCT AND METHOD OF PREPARATION

No Drawing. Application filed May 23, 1925, Serial No. 32,447. Renewed November 28, 1928.

The present invention comprises an improved resinous composition made by chemical combination and condensation of an aliphatic polyhydric alcohol, such as glycerine, one or more polybasic acids and a small portion of sulphuric acid.

I introduce to advantage into the resin a fatty acid component, preferably an acid derived from drying oil, such as linseed oil or China-wood oil.

As a consequence of my invention, I have provided resins which are capable of being transformed from a fusible, soluble state to an infusible, insoluble state in a shorter time than similar resins heretofore produced, and which have superior physical properties, in particular are capable of polymerization or setting with a hard surface while retaining a high elasticity or flexibility.

The utilization of sulphuric acid in accordance with my invention, which involves the heating together of the resin-forming constituents with a relatively small proportion of sulphuric acid, may be distinguished from the use of such acid as an ordinary catalyzer by the fact that the chemical reaction which would occur in the absence of the sulphuric acid is modified by the sulphuric acid as evidenced by the color of intermediate products, the odor of the gaseous by-products and the distinct physical properties of the ultimate resinous product.

The following specific example illustrates the mode of carrying out my invention.

About ninety-two parts of glycerine and two hundred parts of phthalic anhydride by weight are heated with about 10 c. c. of concentrated sulphuric acid at a temperature rising slowly to about 120° C. The solution turns to a dark brown color, probably due to some decomposing action of the acid similar to charring. The vapors given off consist of steam and some sulphur dioxide fumes but very little anhydride volatilizes. This indicates that the sulphuric acid takes part in the reaction instead of serving merely as a catalyst. As the heating is continued the solution becomes a dark red in color and thickens, the gases coming off having an odor somewhat like burnt sugar. As the action progresses some anhydride is volatilized. After the rather violent reaction which occurs at first has ceased, and a quiet stage is reached at which a resin has been formed, the desired fatty acid is added. For example, about 70 parts of eleostearic acid (derived from China-wood oil) are added. The acid forms a distinct layer upon the glyceryl phthalate produced during the first part of the reaction and upon heating causes a vigorous chemical reaction to occur. At 150° C. the reaction is so vigorous that heating must be interrupted to prevent the contents from boiling over. At this stage an offensive odor is given off by the reacting ingredients. After the more violent reaction has ceased, the temperature may be increased to 175° C., causing some volatilization of the anhydride. Upon continued heating the solution thickens and grows darker in color. Complete miscibility occurs finally at 185° C. at which point the heating is interrupted. The resulting resin is a deep red in color and is soluble in acetone, benzol-alcohol, acetone oil and other solvents. Linoleic acid may be used in place of the eleostearic acid.

When this resin, produced by either one of the above methods, is heated for a sufficient length of time, it becomes infusible and insoluble and has a hard glass-like surface, while possessing considerable flexibility. It is tough and strong and therefore well suited for use as a binder in moulding compounds, as a wire enamel, and as a protective coating for metals. The resin is resistant to moisture, oil and acid. It is also highly adhesive to metal surfaces. It may be applied either by spraying the parts to be coated or by dipping them into the fluid resin.

A film consisting of this new resin on a surface of a metal can be hardened in about thirty minutes at about 210° C., whereas similar resins made without the use of sulphuric acid will require several hours for hardening. In some cases the described resin, to advantage, can be dissolved in a high boiling point solvent, such as glycol-diacetate or diethyl-phthalate and a solution applied as a varnish to parts to be coated.

The high boiling point solvent is advantageously used when the resin is to be applied as a film for protective purposes or for electrical insulating purposes. The high boiling point of the solvent permits of a more uniform distribution of the resin. The solution may be applied by dipping, spraying or brushing, and then is heated to a temperature high enough to eliminate the solvent. The resin becomes partly cured before all of the solvent is removed and hence the resin remains uniformly distributed on the surface being coated.

The flexibility of the resin may be further increased by incorporating material such as China-wood oil or castor oil with the resin in the high boiling point solvent.

What I claim as new and desire to secure by Letters Patent of the United States is:

1. A resin comprising the reaction product of an aliphatic polyhydric alcohol and a polybasic acid, a fatty acid derived from a drying oil and a small proportion of sulphuric acid.

2. A resinous composition constituted by the reaction product of an aliphatic polyhydric alcohol, phthalic anhydride, a fatty acid, derived from a drying oil and a small proportion of sulphuric acid.

3. A resinous composition constituted by the reaction product of glycerine, phthalic anhydride, a fatty acid derived from a drying oil and sulphuric acid.

4. A resinous composition constituted by the reaction product of glycerine, phthalic anhydride, eleostearic acid and a small portion of sulphuric acid.

5. The method of preparing a resin which consists in heating a mixture of an aliphatic polyhydric alcohol, a polybasic acid and a relatively small proportion of sulphuric acid to a reaction temperature, continuing heating until a resinous product is formed and interrupting the reaction before said resin is rendered infusible and insoluble.

6. The method of preparing a resin which consists in heating a mixture of glycerine, phthalic anhydride and a small proportion of sulphuric acid until reaction occurs, forming a resinous product, adding a fatty acid derived from a drying oil to said product and continuing heating until miscibility of the resinous product and the acid occurs.

7. The method of preparing a resin which consists in heating about ninety-two parts of glycerine, about two hundreds parts of phthalic anhydride and about 10 c. c. of concentrated sulphuric acid until a resinous product is formed, adding about seventy parts of eleostearic acid and continuing the heating until said acid combines with said resinous product.

8. A resinous composition constituted of the glyceride of phthalic anhydride, a drying oil acid and a lesser amount of sulphuric acid, said composition being deep red in color, soluble in organic solvents and being convertible by heat to a hard, insoluble state in which it is resistant to moisture, oil and acid.

In witness whereof, I have hereunto set my hand this 22nd day of May, 1925.

EDWARD S. DAWSON, Jr.